United States Patent [19]

DeTorre

[11] 4,300,934
[45] Nov. 17, 1981

[54] METHOD OF AND APPARATUS FOR SCORING A COATED SUBSTRATE

[75] Inventor: Robert P. DeTorre, Pittsburgh, Pa.

[73] Assignee: PPG Industries, Inc., Pittsburgh, Pa.

[21] Appl. No.: 153,387

[22] Filed: May 27, 1980

[51] Int. Cl.$^3$ ............... C03B 27/00; C03B 33/02; C03C 17/22

[52] U.S. Cl. ............... 65/60.1; 65/61; 65/112; 65/114; 65/60.8; 83/880; 427/272; 427/276; 427/278; 427/282; 427/284; 427/287; 427/292

[58] Field of Search ............... 65/60 R, 61, 112, 114; 427/272, 277, 278, 282, 284, 287, 289, 292, 276; 83/880

[56] References Cited

U.S. PATENT DOCUMENTS

| | | | |
|---|---|---|---|
| 3,260,584 | 7/1966 | Badger | 65/60 R |
| 3,352,655 | 11/1967 | Barch et al. | 65/114 X |
| 3,638,564 | 2/1972 | Prange et al. | 101/129 X |
| 3,699,644 | 10/1972 | Cocca | 83/880 X |
| 3,756,482 | 9/1973 | DeTorre | 65/113 |
| 3,894,456 | 7/1975 | Boller et al. | 83/880 |
| 4,119,426 | 10/1978 | Kelly | 65/114 X |
| 4,137,803 | 2/1979 | Goldinger | 83/881 |
| 4,140,820 | 2/1979 | DeTorre | 427/292 |

*Primary Examiner*—Richard V. Fisher
*Attorney, Agent, or Firm*—Donald C. Lepiane

[57] ABSTRACT

An automotive window is manufactured by silk screening a pattern of a ceramic paste on a piece of glass having peripheral dimensions greater than the peripheral dimensions of the window. During the silk screening, portions of the screen extending beyond the pattern are supported by glass portions extending beyond the window to prevent bending of the screen near the pattern. The piece is scored through the pattern to define the window or a window blank within the piece and thereafter the glass around the window is removed. The window is then tempered at which time the ceramic paste fuses to the window.

22 Claims, 8 Drawing Figures

METHOD OF AND APPARATUS FOR SCORING A COATED SUBSTRATE

BACKGROUND OF THE INVENTION

1. Field of the Invention:

This invention relates to a method of and apparatus for scoring a coated substrate e.g. an automotive window blank.

2. Discussion of the Technical Problems:

Automotive body weight and wind resistance are being reduced to improve fuel efficiency. One technique is to eliminate metal trim around the automotive windows or lites by flush glazing. In flush glazing the lite is secured in a recess by an adhesive. To prevent degradation of the adhesive as a result of exposure to the sun's rays, an opaque endless band is provided around the marginal edge portions of the lite. The band preferably extends to the peripheral edge of the lite; has a width sufficient to shade the underlying adhesive; has a width sufficiently narrow to provide maximum vision and is abrasive resistant to withstand cleaning and the elements. These requirements have been achieved by silk screening a band of a ceramic paste on an automotive window blank and fusing the paste to the glass by heat. In order to assure shading of the underlying adhesive and extending the pattern out to the peripheral edge, the silk screen pattern is slightly larger than the blank. This technique although accomplishing the above results reduces the useable life of the screen because the screen bends over the cut glass edge during the silk screening process.

It would be advantageous, therefore, to provide a silk screening technique to manufacture automotive lites for flush glazing that does not have the limitations of the above-described techniques.

SUMMARY OF THE INVENTION

This invention relates to a method of manufacturing a sheet of refractory material e.g. an automotive window having a predetermined configuration and a pattern e.g. an endless band of a fired ceramic or enamel on or adjacent the marginal edge portions of the window. The method includes the steps of coating the pattern e.g. silk screening a ceramic paste within edges of a glass piece with selected portions of the coating e.g. the endless band of ceramic paste defining the sheet within the piece. Thereafter the piece is scored e.g. through the endless band of enamel paste to outline the sheet within the piece afterwhich the sheet is removed from the piece.

In the practice of the invention the useable life of silk screens is increased because the portion of the silk screen outside of the pattern is supported by portions of the piece extending beyond the sheet.

Further, this invention relates to an apparatus for scoring a sheet of refractory material having a coating thereon, e.g. a baked enamel paste. The apparatus has a wiper to clear a score path through the paste and a scoring wheel upstream of the wiper for scoring the sheet along the score path.

DESCRIPTION OF THE INVENTION

Figure 1:
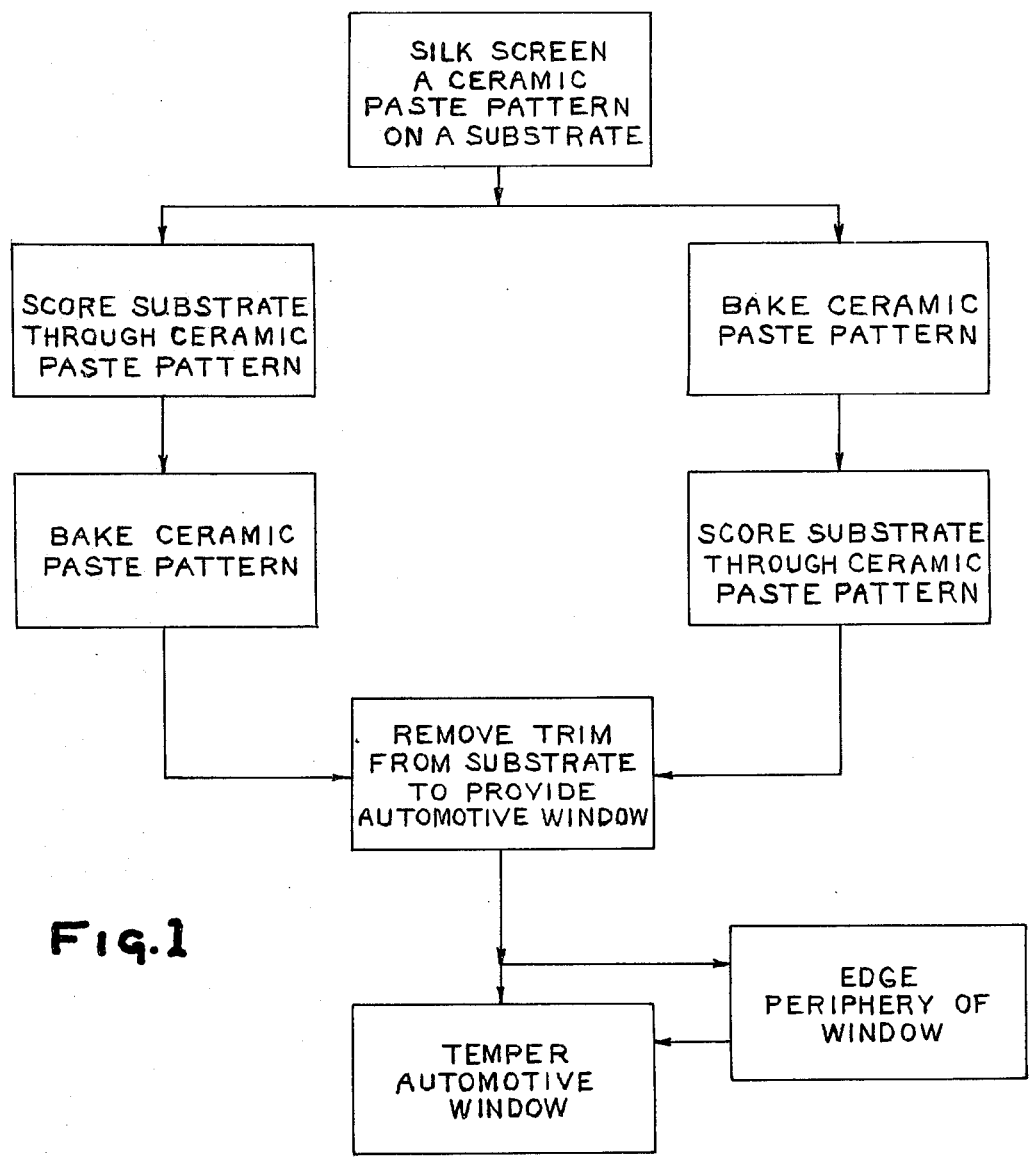
FIG. 1 is a flow diagram illustrating steps incorporating features of the invention for manufacturing an automotive window.
Figure 2:
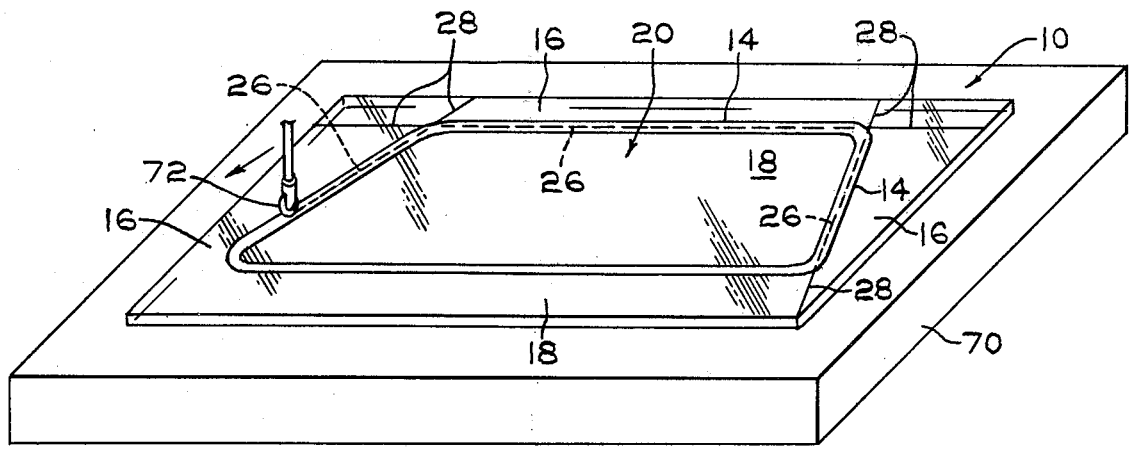
FIG. 2 is an isometric view showing the scoring of a coated automotive window blank in accordance with the teachings of the invention.
Figure 3:
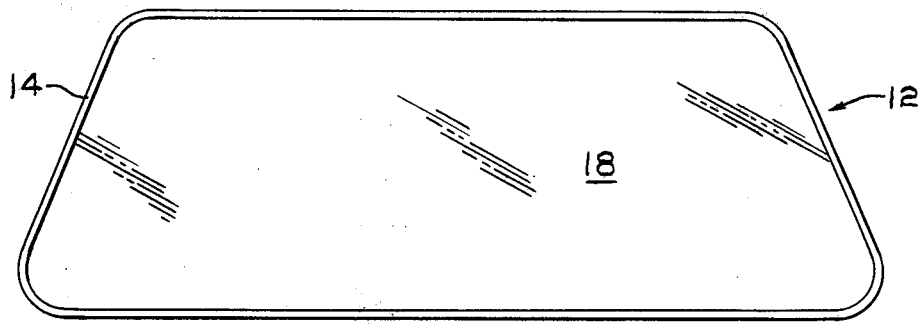
FIG. 3 is a front elevated view of an automotive window manufactured in accordance with the teachings of the invention.
Figure 4:
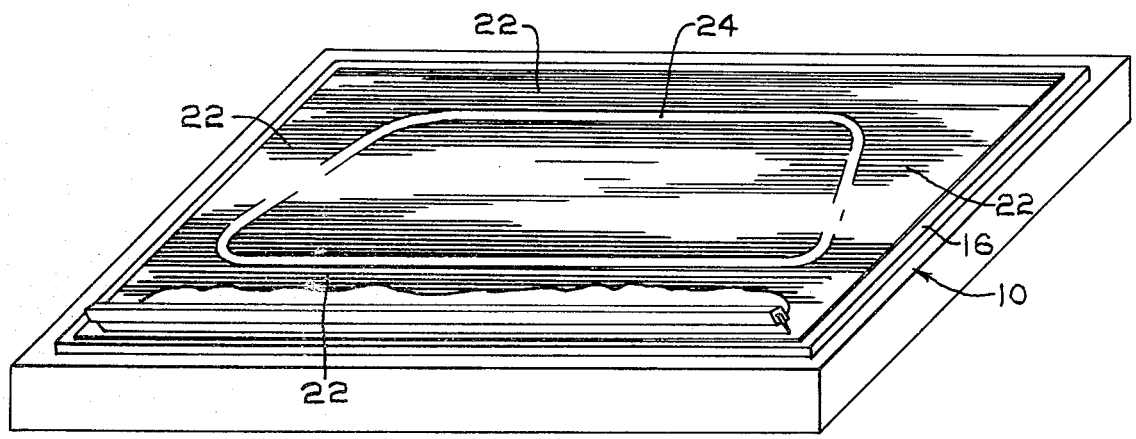
FIG. 4 is an isometric view illustrating the silk screening of a ceramic paste pattern on a glass sheet in accordance with the teachings of the invention.

The flow chart shown in FIG. 1 illustrates process steps incorporating features of the invention for the production of automotive windows or lites, e.g. automotive back windows. As will be appreciated, the invention is not limited to the manufacture of automotive back windows which is presented to illustrate one environment in which the invention may be practiced. A glass sheet or substrate 10 (see FIG. 2) having peripheral dimensions larger than corresponding peripheral dimensions of the finished back window 12 (see FIG. 3) has a pattern 14 of a ceramic or enamel paste conveniently applied thereto e.g. by silk screening. Taught in U.S. Pat. No. 3,638,564 is a silk screen technique that is not limiting to the invention but may be used in the practice of the invention. The teachings of U.S. Pat. No. 3,638,564 are hereby incorporated by reference. During the silk screening, sheet surface portions or trim 16 which extend beyond area 18 of the back window blank 20 (FIG. 2) support silk screen portions 22 beyond screen pattern 24 (FIG. 4) corresponding to the pattern 14 on the sheet 10 (FIG. 2). In this manner bending of the screen portions 22 over cut glass edges is eliminated to increase the life of the screen.

As illustrated in the flow chart of FIG. 1, in one embodiment the glass sheet 10 having the ceramic paste pattern 14 is conveniently scored as shown in FIG. 2 through the pattern 14 to define the automotive blank 20 surrounded by the screen supporting surface portions 16. During the scoring of the substrate 10, the paste of the pattern 14 acts as a lubricant to minimize surface defects. Preferably the score 26 extends through the tension zone of the glass sheet with minimal, if any, surface defects to minimize or retard healing or closing of the score. If the score does heal, removal of the supporting portions 16 from the window blank 18 may require rescoring of the sheet 10.

It is generally recognized that a glass sheet has an inner tension zone between two outer compression zones. The tension zone has a depth approximately 60 percent of the glass thickness and each of the compression zones has a depth approximately 20 percent of the glass thickness. A technique known as deep fissure scoring provides a score having minimal surface damage. In general, an initial score has a depth down to the compression zone of the glass sheet and thereafter interacts with the tension zone to propagate the score to the opposite compression zone. This type of score is taught in U.S. Pat. No. 3,756,482 which teachings are hereby incorporated by reference. As shown in FIG. 2, relief scores 28 extending from peripheral edge portions of the sheet 10 to the score 26 are imposed in the sheet 10 for ease of removing the supporting sheet portions 16 in subsequent operations to be discussed below.

Figure 5:
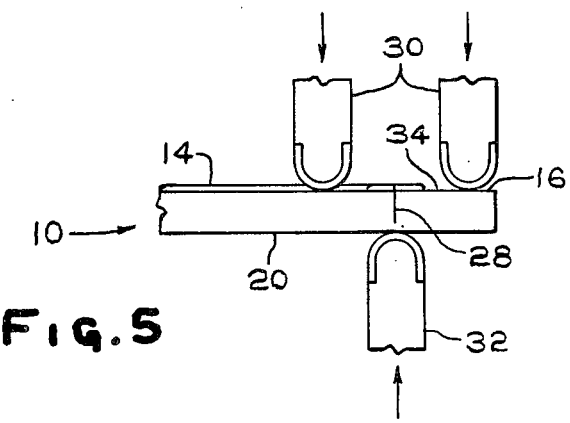
FIG. 5 is a side elevated view showing the application of bending moment forces about a score to remove trim from an automotive blank in accordance with the teachings of the invention.

As shown in FIG. 1, after the sheet 10 is scored, the ceramic paste pattern is preferably heated or baked at low temperatures to slowly remove any volatiles therein. Although not shown in the flow chart of FIG. 1, the supporting sheet portions 16 may be conveniently removed from the window blank 20 prior to baking of the ceramic paste pattern 14. To prevent possible damage to the pattern 14 and to take advantage of the heat of the baking step which may propagate the scores 26 and 28 through the sheet 10, it is recommended that the baking operation be performed prior to removal of the supporting sheet portions 16. After baking, the supporting sheet portions 16 remaining about the window blank 20 are removed in any convenient manner. For example and as shown in FIG. 5, downward forces 30 are applied about the baked ceramic paste pattern 14 as an upward force 32 is applied on the opposite side at the score 28 or 26.

Figure 6:
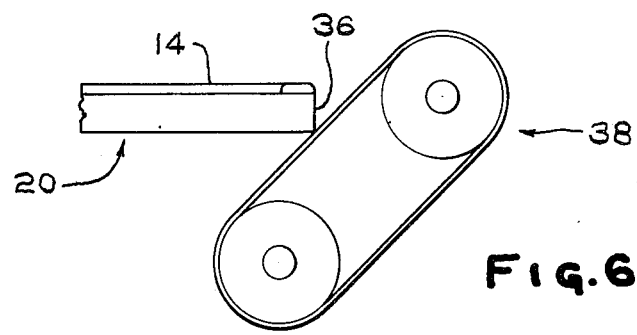
FIG. 6 is a side elevated view illustrating the edging of an automotive blank cut edge in accordance with the teachings of the invention.

The window blank 20 having the baked ceramic paste pattern 14 may be tempered, e.g. as taught in U.S. Pat. No. 4,119,426 which teachings are hereby incorporated by reference, or processed through an edging operation as shown in FIG. 6 to remove damage at the cut edges 36. This may be accomplished by using a hand held belt sander 38 which is a conventional operation and does not require further discussion. After edging the window blank 20 may be tempered to provide the automotive window 18 shown in FIG. 3. It should be noted that extreme edge damage may cause the glass window to fracture during the tempering operation and therefore should be removed. However, it has been found that more edge damage can be tolerated during tempering without glass breakage when the window blank 20 has an opaque coating at the edge. It is theorized that the opaque coating concentrates and retains heat at the marginal edge portions of the glass which slows cooling at the heated marginal edge portions.

Figure 7:
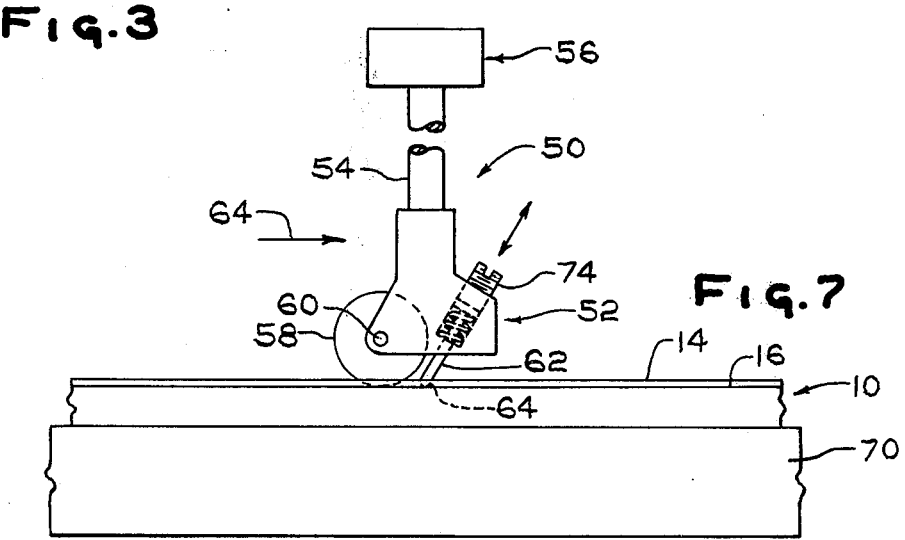
FIG. 7 is a side elevated view of a scoring apparatus for scoring a baked enamel paste pattern in accordance with the teachings of the invention.
Figure 8:
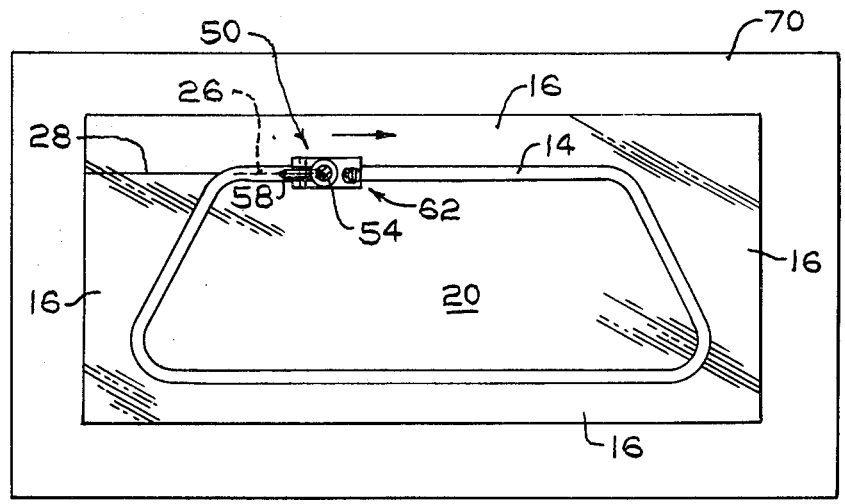
FIG. 8 is a plan view of FIG. 7.

Referring back to FIG. 1, in another embodiment of the invention, after the ceramic paste pattern 14 has been silk screened on the sheet 10, the sheet 10 is baked as previously discussed to remove the volatiles therein. Thereafter, the sheet 10 is scored to define the automotive blank 20 having the supporting portions 16. Shown in FIGS. 7 and 8 is scoring apparatus 50 incorporating features of the invention that may be used for scoring a pattern of a highly viscous coating, e.g. a baked ceramic paste. The scoring apparatus 50 has a housing 52 mounted on stem 54 of a force applying device 56, e.g. of the type taught in U.S. Pat. No. 4,137,803 which teachings are hereby incorporated by reference. Scoring wheel 58 is rotatably mounted in the housing 52 on shaft 60 upstream of wiper 62 as the scoring apparatus 50 conveniently moves in the direction of the arrow 64. Wiper end 64 clears a path through the baked enamel paste pattern 14 as the scoring wheel 58 scores the glass sheet 10. It is recommended that the wheel 58 and wiper end 64 be close to one another to provide a clear scoring path for non-linear scores e.g. around bends.

After the scoring, the trim or supporting sheet surface portions 16 are removed and the tempering or edging steps previously discussed are performed.

As can now be appreciated, the invention is not limited to the scoring of glass sheets which are subsequently tempered, e.g. the invention may be practiced on automotive windshields. Further, if the glass sheet is to be bent, the baking of the ceramic paste pattern to remove the volatiles may be practiced during the bending of the sheet. Further, the invention is not limited to the composition of the ceramic paste. Still further, the technique for eliminating or reducing edging of the automotive window blank to be tempered may be used on glass sheets to be tempered for architectural glazing.

DETAILED DESCRIPTION OF THE INVENTION

With reference to FIG. 1, a glass sheet 10 having a thickness of about 3/16 inch (0.47 centimeters), a length of about 3 feet (0.9 meters) and a width of about 5 feet (1.5 meters) has a trapezoidal pattern 14 of a ceramic paste of the type sold by Drakenfield Co. of Washington, Pa., 24-1169 mat black silk screened on sheet surface 16 in any convenient manner. The base of the pattern has a length of about 4 feet (1.2 meters) with the opposite side having a length of about 3 feet (0.9 meters). The sides each have a length of about 1 ½ feet (0.45 meters). Score 26 imposed in the glass sheet through the pattern and between the sides to define automotive blank 20 having supporting glass portions 16 as shown in FIG. 2. The score 26 is imposed in the sheet 10 supported on table 70 by a scoring wheel 72 having a 7/32 inch diameter, an apex angle of about 140°–155°, urged against the sheet under a force of about 15–25 pounds (6.8–11.4 kilograms) and moving relative to the sheet at a speed of about 10–30 inches (0.25–0.75 meters) per second. The initial score in the sheet is approximately 30 percent of the glass thickness and interacts with the inner tension zone to propagate the score through the tension zone to the opposite compression zone. After the glass sheet is scored, it is conveniently baked at a temperature of about 400° F. (204° C.) to drive out the volatiles e.g. pine oil in the ceramic paste. After the baking, bending moments 30 and 32 are shown in FIG. 5 are conveniently applied at glass surface 34 about the scores 26 and 28 to remove the sheet portions 16 not removed during the baking operation. The edges of the glass sheet are thereafter edged in any convenient manner e.g. by a hand sander 38 as shown in FIG. 6 and thereafter the window blank 20 is tempered in any convenient manner to provide the automotive back window 12 shown in FIG. 3.

In another embodiment of the invention the glass sheet 10 is baked as discussed above after the ceramic paste pattern 14 is silk screened thereon. With reference to FIGS. 7 and 8 a scoring apparatus 50 having a scoring wheel 58 similar to the scoring wheel 72 discussed above is mounted in housing 52 in spaced relation to a spring loaded wiper 62 of the type sold by Vlier Engineering Corp. as spring plunger No. S-52N. The wiper 62 has an upper threaded portion 74 threaded in the housing 52 and a lower spherical end 64. The spherical end 64 is spaced about ¼ inch (0.64 centimeter) from the wheel 58 and spaced about 0.001 inch (0.025 millimeter) above the glass sheet surface 16. As the scoring apparatus 50 moves in the direction of the arrow 64 at a speed of about 10–30 inches (0.25–0.75 meters) per minute, the spherical end portion 64 clears a path for the scoring wheel 58. After the sheet is scored, the supporting glass portions 16 are removed as previously discussed and the blank 20 is edged and tempered as previously discussed.

During the tempering operation, the ceramic paste fuses to the glass.

As can now be appreciated, the above examples are not limited to the invention and are presented to illustrate the practice of the invention in the manufacture of automotive windows. Further, in the discussion the terms "automotive window blank" and "automotive window" were used for clarity of discussion and therefore the automotive window may be the automotive window blank and vice versa.

What is claimed is:

1. A method of manufacturing a sheet of refractory material having a predetermined configuration and having a pattern on a surface of the sheet with at least a portion of the pattern at the marginal edge of the sheet, comprising the steps of:

silk screening a ceramic paste pattern within edges of a piece of refractory material having peripheral dimensions greater than the peripheral dimensions of the sheet so as to support at least a screen portion which extends beyond the ceramic paste pattern by portions of the refractory piece that extend beyond the peripheral dimensions of the sheet;

scoring the refractory piece to define the sheet within the piece, said scoring step including scoring through the ceramic paste pattern to be at the marginal edges of the sheet; and removing the sheet from the piece.

2. The method as set forth in claim 1 wherein the ceramic paste pattern includes an endless band at the marginal edge portions of the sheet.

3. The method as set forth in claims 1 or 2 wherein the paste has volatiles and further including the step of heating the sheet having the ceramic paste pattern thereon to remove the volatiles in the ceramic paste pattern.

4. The method as set forth in claim 3 wherein said scoring step is practiced after said heating step.

5. The method as set forth in claim 3 wherein said scoring step is practiced before said heating step.

6. The method according to claim 3 wherein the piece of refractory material is a glass piece and the sheet is an automotive window blank.

7. The method as set forth in claim 6 wherein the scored piece is an automotive window blank having supporting glass surface portions and said scoring step is practiced after said heating step and further including a step of:

tempering the window blank wherein the ceramic paste pattern during said tempering step fuses to the automotive blank to provide the automotive window.

8. The method as set forth in claim 7 further including a step of edging portions of the automotive blank edge prior to practicing said tempering step.

9. The method as set forth in claim 6 wherein said scoring step is practiced after said heating step and further includes:

clearing a scoring path through the ceramic paste pattern overlying portions of the sheet to be scored.

10. The method as set forth in claim 9 wherein the scored piece is an automotive window blank having supporting glass surface portions and further including a step of:

tempering the automotive blank wherein the ceramic paste pattern during said tempering step fuses to the automotive blank to provide the automotive window.

11. The method as set forth in claim 10 further including a step of:

edging portions of the automotive blank edge prior to practicing said tempering step.

12. The method as set forth in claim 6 wherein the scored piece is an automotive window blank having supporting glass surface portions and further including a step of:

tempering the automotive blank wherein the ceramic paste pattern during said tempering step fuses to the automotive blank to provide the automotive window.

13. The method as set forth in claim 12 further including a step of:

edging portions of the automotive blank edge prior to practicing said tempering step.

14. The method as set forth in claim 1 or 2 further including a step of heating the sheet to fuse the ceramic pattern to the sheet.

15. The method as set forth in claim 14 wherein the sheet is a glass sheet of a laminated automotive windshield.

16. A method of tempering a glass sheet, comprising the steps of:

silk screening a heat absorbing ceramic paste pattern on a piece of glass to define a glass sheet to be tempered, said silk screening step being practiced while supporting screen portions extending beyond the screen pattern by trim which extends beyond the heat absorbing pattern on the glass piece;

removing the trim to provide the glass sheet to be tempered, the glass sheet having as removed peripheral and marginal edges and heat absorbing material on the marginal edge of at least one surface of the sheet; and tempering the glass sheet having the as removed edges and heat absorbing material on the marginal edge of the sheet surface.

17. The method as set forth in claim 16 wherein the pattern includes an endless band of ceramic paste applied to the marginal edge of the sheet.

18. The method as set forth in claim 17 wherein the heat absorbing pattern is a ceramic paste having volatiles and further including a step of heating the sheet having the heat absorbing pattern thereon to remove the volatiles in the paste.

19. The method as set forth in claim 18 wherein said removing step includes scoring the piece and said scoring step is practiced after said heating step.

20. The method as set forth in claim 18 wherein said removing step includes scoring the piece and said scoring step is practiced before said heating step.

21. The method as set forth in claim 18 wherein the sheet is an automotive window.

22. The method as set forth in claim 21 wherein said removing step includes scoring the sheet and said scoring step is practiced after said heating step and further includes a step of:

clearing a scoring path through the ceramic paste pattern overlying portions of the piece to be scored.

* * * * *